US011981015B2

(12) United States Patent
Ruiz et al.

(10) Patent No.: US 11,981,015 B2
(45) Date of Patent: May 14, 2024

(54) MULTI-FUNCTION FIREFIGHTING TOOL

(71) Applicants: Andrew Ruben Ruiz, Fullerton, CA (US); Doak Stanley Smith, Thousand Oaks, CA (US)

(72) Inventors: Andrew Ruben Ruiz, Fullerton, CA (US); Doak Stanley Smith, Thousand Oaks, CA (US)

( * ) Notice: Subject to any disclaimer, the term of this patent is extended or adjusted under 35 U.S.C. 154(b) by 0 days.

(21) Appl. No.: 17/583,089

(22) Filed: Jan. 24, 2022

(65) Prior Publication Data

US 2022/0234187 A1 Jul. 28, 2022

Related U.S. Application Data

(60) Provisional application No. 63/141,826, filed on Jan. 26, 2021.

(51) Int. Cl.

| | |
|---|---|
| ***B25F 1/02*** | (2006.01) |
| ***A62B 3/00*** | (2006.01) |
| ***B25B 7/10*** | (2006.01) |
| ***B25B 7/22*** | (2006.01) |
| ***B25F 1/00*** | (2006.01) |

(52) U.S. Cl.

CPC .................. *B25F 1/02* (2013.01); *B25B 7/22* (2013.01); *B25F 1/003* (2013.01); *A62B 3/005* (2013.01); *B25B 7/10* (2013.01)

(58) Field of Classification Search

CPC ... B25F 1/02; B25F 1/003; B25B 7/22; B25B 7/10; A62B 3/005

USPC ................... 81/414; 7/161, 125, 127; D8/55

See application file for complete search history.

(56) References Cited

U.S. PATENT DOCUMENTS

| | | | | |
|---|---|---|---|---|
| 836,075 | A * | 11/1906 | Loudon | B25B 7/22 7/130 |
| 930,973 | A * | 8/1909 | Kleffman | B25B 7/22 7/165 |
| D281,216 | S * | 11/1985 | Cutliff, Jr. | D8/55 |
| 5,327,602 | A * | 7/1994 | Stenger | B25F 1/003 7/125 |
| 6,202,517 | B1 * | 3/2001 | Dolan | B25C 11/00 81/418 |
| 6,223,373 | B1 * | 5/2001 | Yeh | B25B 23/005 7/137 |
| 7,162,758 | B2 * | 1/2007 | Skinner | G01C 9/26 7/164 |
| 2003/0154552 | A1 * | 8/2003 | Oka | B25B 7/10 7/127 |
| 2008/0022813 | A1 * | 1/2008 | Farrell | B25B 13/50 7/138 |
| 2009/0211034 | A1 * | 8/2009 | Lionel | B25F 1/02 7/127 |
| 2009/0307847 | A1 * | 12/2009 | Liou | B25G 1/04 7/166 |

(Continued)

*Primary Examiner* — Bryan R Muller
*Assistant Examiner* — Jacob Adam Montgomery
(74) *Attorney, Agent, or Firm* — JT IP Law, PC

(57) ABSTRACT

A plier having multiple functions includes a fixed leg having a pivot point, a fixed handle on a first side of the pivot point, and an upper jaw on a second side of the pivot point. The plier further includes a moveable leg rotatably coupled to the fixed leg at the pivot point and having a moveable handle on the first side of the pivot point and a lower jaw on the second side of the pivot point, the lower jaw defining a spanner extending away from the upper jaw.

1 Claim, 9 Drawing Sheets

(56) References Cited

U.S. PATENT DOCUMENTS

2014/0259695 A1* 9/2014 Guynn .................... B25D 7/00
81/20

* cited by examiner

MULTI-FUNCTION FIREFIGHTING TOOL

CROSS-REFERENCE TO RELATED APPLICATIONS

This application claims the benefit and priority of U.S. Provisional Application No. 63/141,826, titled MULTI-PURPOSE PLIER and filed Jan. 26, 2021, the entire disclosure of which being expressly incorporated by reference herein in its entirety.

BACKGROUND

Field

The present disclosure is directed to a multifunctional tool which may be used, for example, by firefighters.

Description of the Related Art

Firefighters may be assigned to a number of different emergency calls. Sometimes firefighters are the first emergency responders on a scene and may take on additional duties as required by the situation. For example, a firefighter may be called to rescue people or animals from a burning structure, may be called to the scene of a vehicular accident to ensure the health and safety of passengers and to reduce the likelihood of a damaged car erupting in flames. Each type of emergency may require multiple tools. For example, a firefighter called to a burning structure may be called on to attach a hose to a fire hydrant, to gain access to a structure (which may include prying a door open, using a screw or other driver to remove an object, breaking glass, or the like), to cut cables or wires to reduce the likelihood of further fires erupting, or the like. Each of these actions and more may require specialized tools. Carrying even a portion of the tools that may be used for a particular job may be difficult. Furthermore, some of these tools may be designed for intense conditions and may thus have considerable weight associated with them. The amount of increased weight that a firefighter may carry around may slow the firefighter down in time-sensitive conditions, which may mean the difference between life and death as well as potential loss of property. In addition, if only some tools are being carried by a firefighter and additional tools are required while at a scene, the firefighter may need to return to the fire apparatus to retrieve additional tools, which also slows down progress and may likewise risk lives and property.

Thus, there is a need in the art for a tool that is usable by firefighters to achieve multiple objectives during an emergency situation.

SUMMARY

Described herein is a plier having multiple functions. The plier includes a fixed leg having a pivot point, a fixed handle on a first side of the pivot point, and an upper jaw on a second side of the pivot point. The plier further includes a moveable leg rotatably coupled to the fixed leg at the pivot point and having a moveable handle on the first side of the pivot point and a lower jaw on the second side of the pivot point, the lower jaw defining a spanner extending away from the upper jaw.

In any of the foregoing embodiments, the fixed handle or the moveable handle defines a pry tool located at and extending away from a first end of the fixed handle or the moveable handle.

In any of the foregoing embodiments, the other of the fixed handle or the moveable handle defines a magnetic socket at a second end of the other of the fixed handle or the moveable handle for receiving a tool bit.

In any of the foregoing embodiments, the moveable handle defines a nail puller located at the first end of the fixed handle or the moveable handle at a distal end of the pry tool.

In any of the foregoing embodiments, the upper jaw defines a window punch extending away therefrom.

In any of the foregoing embodiments, the moveable leg defines an elongated slot configured to receive a pin coupled to the fixed leg to facilitate adjustment of a distance between the upper jaw and the lower jaw.

In any of the foregoing embodiments, each of the moveable leg and the fixed leg define a plurality of insert holes extending therethrough for receiving valve adjustment lugs.

In any of the foregoing embodiments, at least one of the upper jaw or the lower jaw defines a wire cutter configured to interface with the other of the upper jaw or the lower jaw to cut through wires.

In any of the foregoing embodiments, at least one of the moveable handle or the fixed handle defines a cable cutter configured to interface with the other of the moveable handle or the fixed handle, the cable cutter being configured to cut through wires of a thicker gauge than the wire cutter.

Also disclosed is a multifunction firefighting tool. The multifunction firefighting tool includes a first leg having a pivot point, a first handle on a first side of the pivot point, and an upper jaw on a second side of the pivot point. The multifunction firefighting tool further includes a second leg rotatably coupled to the first leg at the pivot point and having a second handle on the first side of the pivot point and a lower jaw on the second side of the pivot point, the lower jaw defining a spanner extending away from the upper jaw. The multifunction firefighting tool further includes a socket defined at a second end of one of the first handle or the second handle and configured to receive a tool bit.

Any of the foregoing embodiments may further include a pry tool located at and extending away from a first end of the other of the first handle or the second handle.

Any of the foregoing embodiments may further include a nail puller located at the first end of the first handle or the second handle at a distal end of the pry tool.

Any of the foregoing embodiments may further include a window punch extending away from the upper jaw.

In any of the foregoing embodiments, the second leg defines an elongated slot configured to receive a pin coupled to the first leg to facilitate adjustment of a distance between the upper jaw and the lower jaw.

In any of the foregoing embodiments, each of the second leg and the first leg define a plurality of insert holes extending therethrough for receiving valve adjustment lugs.

Any of the foregoing embodiments may further include a wire cutter coupled to or defined by at least one of the upper jaw or the lower jaw and configured to interface with the other of the upper jaw or the lower jaw to cut through wires.

Any of the foregoing embodiments may further include a cable cutter coupled to or defined by at least one of the first handle or the second handle and configured to interface with the other of the second handle or the first handle, the cable cutter being configured to cut through wires of a thicker gauge than the wire cutter.

Also disclosed is a multifunction firefighting tool. The multifunction firefighting tool includes a first leg having a pivot point, a first handle on a first side of the pivot point, and an upper jaw on a second side of the pivot point. The multifunction firefighting tool further includes a second leg rotatably coupled to the first leg at the pivot point and having a second handle on the first side of the pivot point and a lower jaw on the second side of the pivot point, the lower jaw defining a spanner extending away from the upper jaw. The multifunction firefighting tool further includes a socket defined at a second end of one of the first handle or the second handle and configured to receive a tool bit. The multifunction firefighting tool further includes a pry tool located at and extending away from a first end of the other of the first handle or the second handle. The multifunction firefighting tool further includes a nail puller located at the first end of the first handle or the second handle at a distal end of the pry tool. The multifunction firefighting tool further includes a window punch extending away from the upper jaw.

In any of the foregoing embodiments, each of the second leg and the first leg define a plurality of insert holes extending therethrough for receiving valve adjustment lugs.

Any of the foregoing embodiments may further include: wire cutter coupled to or defined by at least one of the upper jaw or the lower jaw and configured to interface with the other of the upper jaw or the lower jaw to cut through wires; and a cable cutter coupled to or defined by at least one of the first handle or the second handle and configured to interface with the other of the second handle or the first handle, the cable cutter being configured to cut through wires of a thicker gauge than the wire cutter.

DETAILED DESCRIPTION

The present disclosure describes a plier having multiple functions integrated into a single assembled component. The plier may be used by firefighters to reduce a quantity of tools to be carried to jobs. The plier provides significant benefits and advantages such as integrating a number of tools used in firefighting (e.g., eight firefighting tools) into a single component or tool, thus reducing a quantity of tools in a pocket or otherwise carried on a person, which also reduces additional weight transported by the person. This further reduces or eliminates additional trips to a fire apparatus to retrieve new tools, saving this time for life-saving and property-saving actions. The plier may be made to have a relatively wide handle to improve grip and comfort. The plier is designed to be easy to put in and remove from pockets or fastener assemblies located in or on firefighter turnouts, making it easily transported to both emergency and non-emergency operations.

Referring generally to the drawings, an exemplary multifunction firefighting tool, or plier, 100 is shown. The tool 100 includes multiple features or components which may be formed integral (i.e., monolithic) with the other components of the plier 100, may be formed separately from the other components and coupled thereto, or any combination thereof (e.g., some components may be formed integral, or monolithic, and other components may be coupled thereto, either removably or permanently). The components may be formed from a metal (e.g., steel or aluminum), plastic, other polymers, or any other material or combination of materials.

Figure 1:
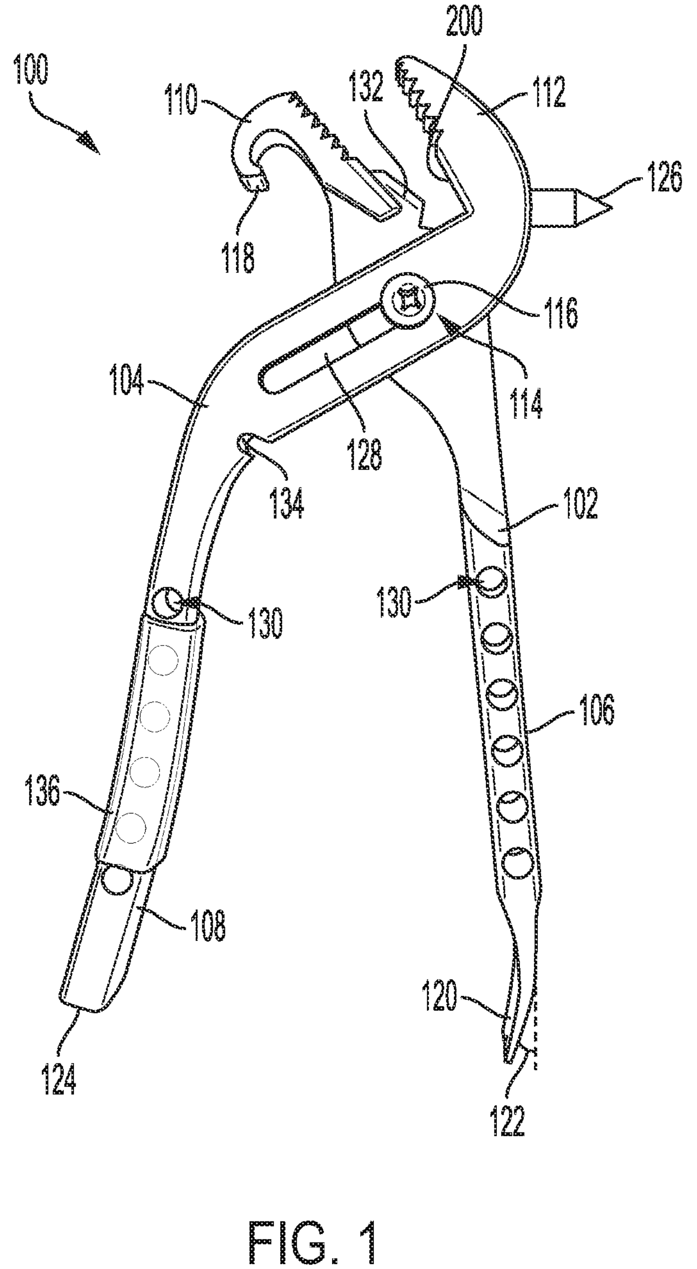
FIG. 1 illustrates an assembled multifunction firefighting tool in accordance with embodiments of the present disclosure.
Figure 2:
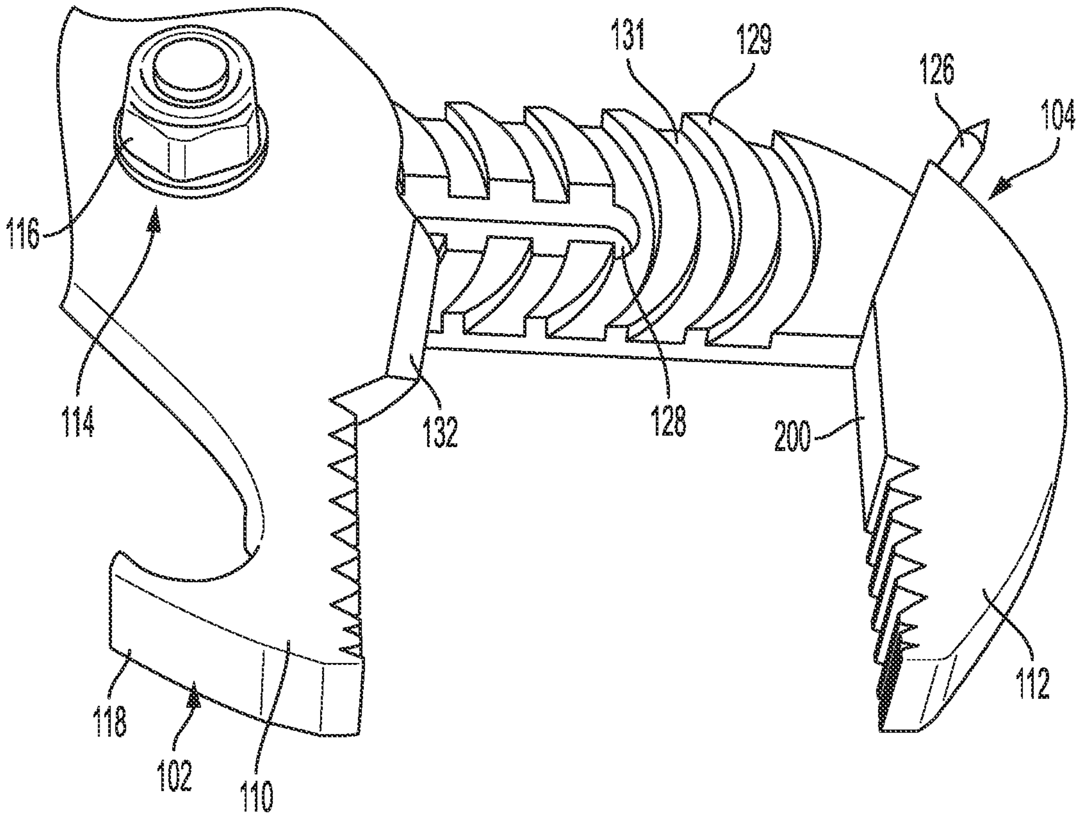
FIG. 2 is an enlarged view of a portion of the multifunction firefighting tool of FIG. 1 illustrating a pair of jaws and features therein in accordance with embodiments of the present disclosure.

The tool 100 may also be referred to as a plier 100 as it includes features that function as a pair of pliers. Referring to FIGS. 1 and 2, the plier 100 has a fixed leg 102 and a movable leg 104. The fixed leg 102 is coupled to the movable leg 104 at a pivot point 114 (e.g., via a pin 116), thus allowing the movable leg 104 to move relative to the fixed leg 102. Where used in this context (referring to a pin similar to the pin 116), a pin may include any elongated member about which one or more components may rotate. For example, a pin may include a conventional pin, a screw, or any other elongated member about which a component may rotate. The pin 116 may include any pin or other similar elongated member, and may be retained in place using any known technique. For example, a screw may extend through an opening in the fixed leg 102 and through the elongated slot 128 of the movable leg 104, and a nut may be coupled to the screw to retain it in place. As another example, a pin may extend through the opening of the fixed leg 102 and through the elongated slot 128 and may have at least one of a large head or clip on either end that fails to extend through the opening of the fixed leg 102 and the elongated slot 128.

In some embodiments, the movable leg 104 may rotate relative to the fixed leg 102. In some embodiments, the movable leg 104 may move along an axis thereof relative to the fixed leg 102. In some embodiments, the fixed leg may be coupled to the movable leg 104 in any known manner and using any type of connector. In some embodiments, both legs 102, 104 may be movable relative to each other. The term "fixed leg" may simply indicate that a "movable leg" may move relative thereto and not necessarily that the leg is fixed in any position (e.g., the "fixed leg" may be referred to as a first leg, and the "movable leg" may be referred to as a second leg).

The fixed leg 102 includes a fixed handle 106 on a first side of the pivot point 114 and a lower jaw 110 on a second side of the pivot point 114, and the movable leg 104 includes a movable handle 108 on the first side of the pivot point 114 and an upper jaw 112 on the second side of the pivot point 114. In some embodiments, a movable leg may include a lower jaw and a fixed leg may include an upper jaw without departing from the scope of the present disclosure. The fixed handle 106 may be formed integral, or monolithic, with the lower jaw 110, and the movable handle 108 may be formed integral, or monolithic, with the upper jaw 112.

Rotation of the movable leg 104 relative to the fixed leg 102 may cause the upper jaw 112 to move towards (and potentially contact) the lower jaw 110 (and rotation of the movable leg 104 relative to the fixed leg 102 in the other direction may cause the upper jaw 112 to move away from the lower jaw 110). In that regard, an object may be clamped between the upper jaw 112 and the lower jaw 110, resulting in the jaws 112, 110 functioning as a pair of pliers.

The movable leg 104 may define an elongated slot 128 for receiving the pin 116, allowing the pivot point 114 to move relative to the movable leg 104 (i.e., along an axis defined by the elongated slot 128). The elongated slot 128 then provides for an adjustable distance between the lower jaw 110 and the upper jaw 112, making the plier 100 an adjustable plier. In some embodiments, the movable leg 104 may define protrusions 129 (e.g., lips, chevrons, ridges, or the like) adjacent to the elongated slot 128 which may define cutouts or slots 131 therebetween along the axis defined by the elongated slot 128. In that regard, the fixed leg 102 may define a protrusion (not shown) which may be received within a slot 131 defined by the protrusions 129. In response to the protrusion of the fixed leg 102 being received within a slot 131, the movable leg 104 may remain in a fixed position (along an axis defined by the elongated slot 128) relative to the fixed leg 102 (e.g., to allow relative rotation while reducing the likelihood of other relative movement). The protrusion of the fixed leg 102 may be removed from the slot 131 (e.g., by locating it within the elongated slot 128) and the movable leg 104 may then move along the axis defined by the elongated slot 128. In that regard, the protrusion of the fixed leg 102 may interface with the protrusions 129 to cause the upper jaw 112 to be in a desired location relative to the lower jaw 110. In that regard, the plier function of the tool 100 may be adjustable (e.g., to allow a distance between the upper jaw 112 and the lower jaw 110 to be adjustable based on a specific use of the plier function).

Figure 5:
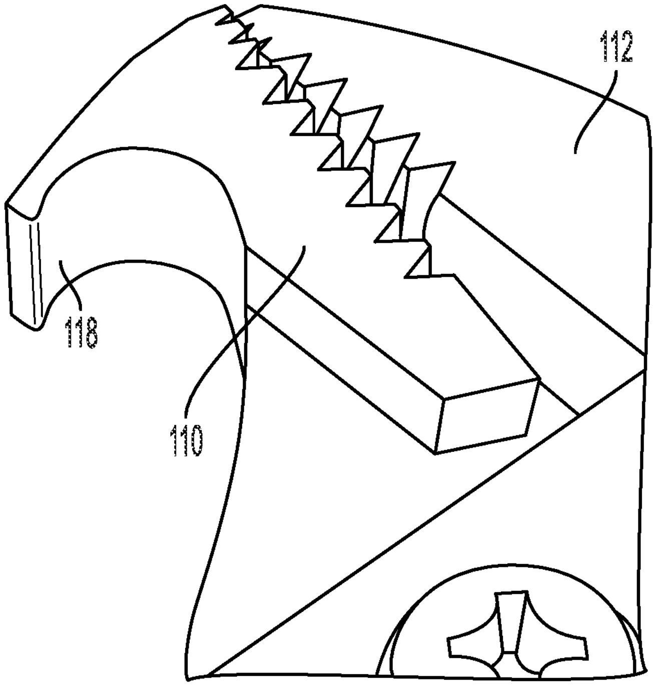
FIG. 5 is an enlarged view of a portion of the multifunction firefighting tool of FIG. 1 illustrating a spanner in accordance with embodiments of the present disclosure.

Referring to FIGS. 1, 2, and 5, the lower jaw 110 is formed to include a spanner, or spanner wrench, 118 extending away therefrom. The spanner 118 may be formed to curve down (i.e., away from the upper jaw 112) and back towards the movable leg 104. The spanner 118 is used in firefighting to tighten or remove hose couplings, hose caps, and a variety of other appliances. For example, the spanner 118 may be designed to interface with hose couplings having sizes of 4 inches, 2.5 inches, 1.75 inches, 1.5 inches, 1 inch, or the like. In some embodiments, the spanner 118 may have another shape. In some embodiments, the spanner 118 may be adjustable to allow for interfacing with couplings of multiple sizes. For example, the spanner 118 may be adjustable to interface with couplings of 4 inches, 2.5 inches, 1.75 inches, 1.5 inches, and 1 inch. In some embodiments, the upper jaw 112 may include or define a spanner extending away therefrom instead of, or in addition to, the spanner 118 located on the lower jaw 110. In some embodiments, the lower jaw 110 may include the spanner 118 designed to interface with couplings of various sizes, and the upper jaw 112 may include another spanner designed to interface with couplings having a second size that is different than the first size.

Figure 8:
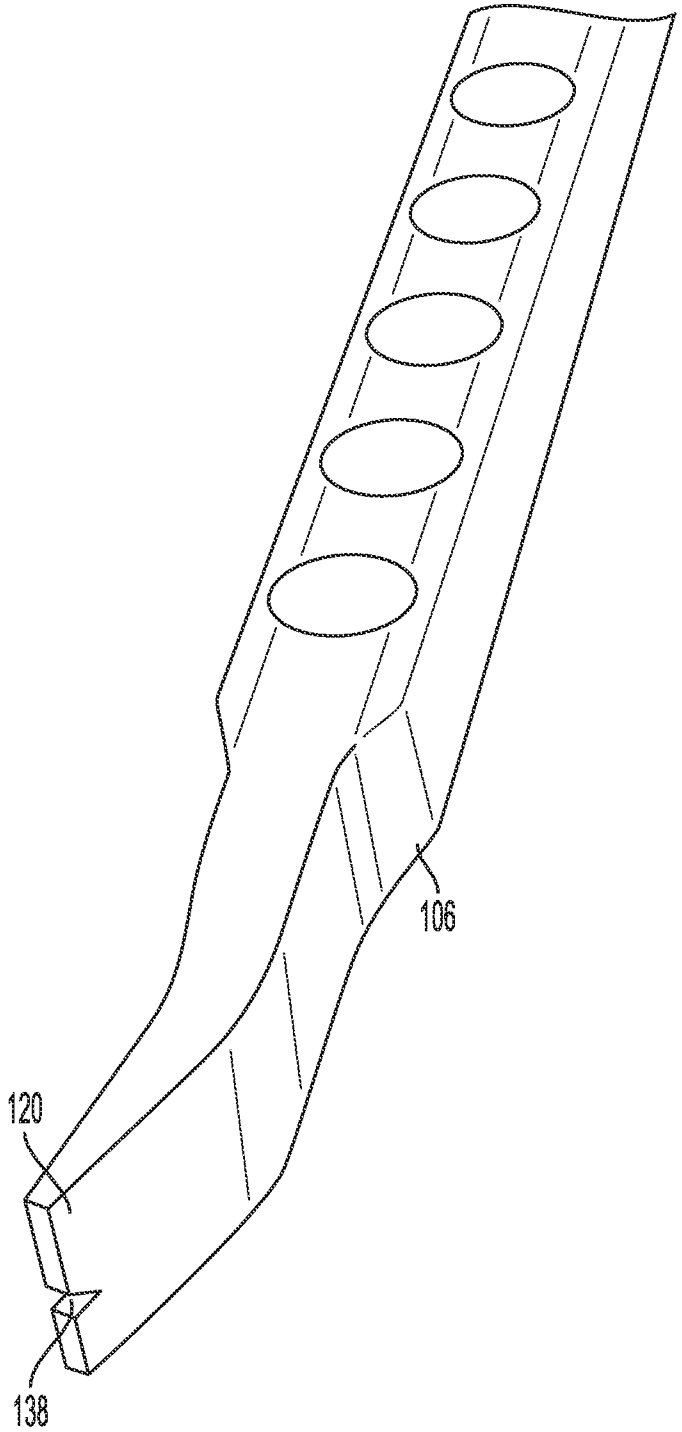
FIG. 8 is an enlarged view of a portion of the multifunction firefighting tool of FIG. 1 illustrating a pry tool in accordance with embodiments of the present disclosure.

Referring to FIGS. 1 and 8, the fixed handle 106 may include or define a pry tool 120 located at and extending away from a first end of the fixed handle 106 (an end that is opposite of the lower jaw 110). In some embodiments, the movable handle 108 may define a pry tool in addition to, or instead of, the fixed handle 106 defining the pry tool without departing from the scope of the present disclosure. The pry tool 120 may be used in a similar manner as a crowbar to wedge items open. The pry tool 120 may form an angle 122 with an axis defined by the fixed handle 106. The angle 122 may be, for example, between 0 degrees and 90 degrees, between 5 degrees and 45 degrees, between 5 degrees and 30 degrees, about 10 degrees, or the like. Where used in this context, about refers to the referenced value plus or minus 10 percent of the referenced value. In some embodiments, the pry tool 120 may be formed integral, or monolithic, with the fixed handle 106 (or the movable handle 108). In some embodiments, the pry tool 120 may be coupled to the respective handle, for example, using adhesive, welding, or the like.

Figure 6:
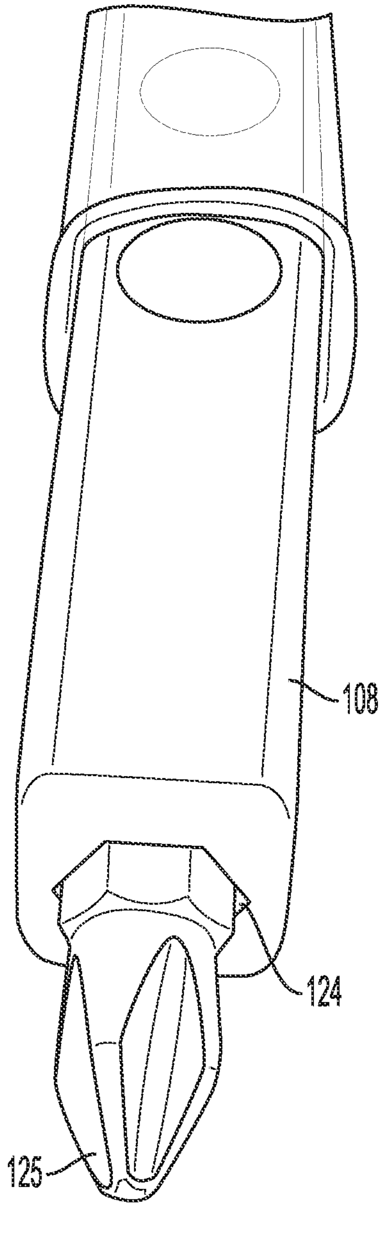
FIG. 6 is an enlarged view of a portion of the multifunction firefighting tool of FIG. 1 illustrating a magnetic socket for receiving a bit in accordance with embodiments of the present disclosure.

Referring to FIGS. 1 and 6, the movable handle 108 may define a magnetic socket 124 at an end of the movable handle 108 (an end that is opposite of the upper jaw 112). In some embodiments, the fixed handle 106 may define the magnetic socket 124 instead of, or in addition to, the movable handle 108 without departing from the scope of the present disclosure. The magnetic socket 124 is designed to receive a bit 125 (e.g., a driver bit such as a Philips head, a flat head, a hex driver head, or the like) and may thus be formed to include edges (e.g., it may include hexagonal edges defining the socket 124 (i.e., a "hex socket")) to reduce the likelihood of rotation of the bit relative to the movable handle 108. The magnetic properties of the magnetic socket 124 reduces the likelihood of separation of the bit 125 from the magnetic socket 124. The magnetic properties may be provided by, for example, a magnet installed at an inner end of the magnetic socket 124. For example, a magnet may be coupled within the magnetic socket 124 and designed to attract and retain any bits 125 located therein. In some embodiments, the respective handle (e.g., the movable handle 108) may be formed to have magnetic properties such that addition of an external magnet may be avoided. In some embodiments, the socket 124 may lack magnetic properties. In some embodiments, an interference fit between the socket 124 and a selected bit 125 may be sufficient to reduce the likelihood of separation of the bit 125 from the socket 124.

Figure 7:
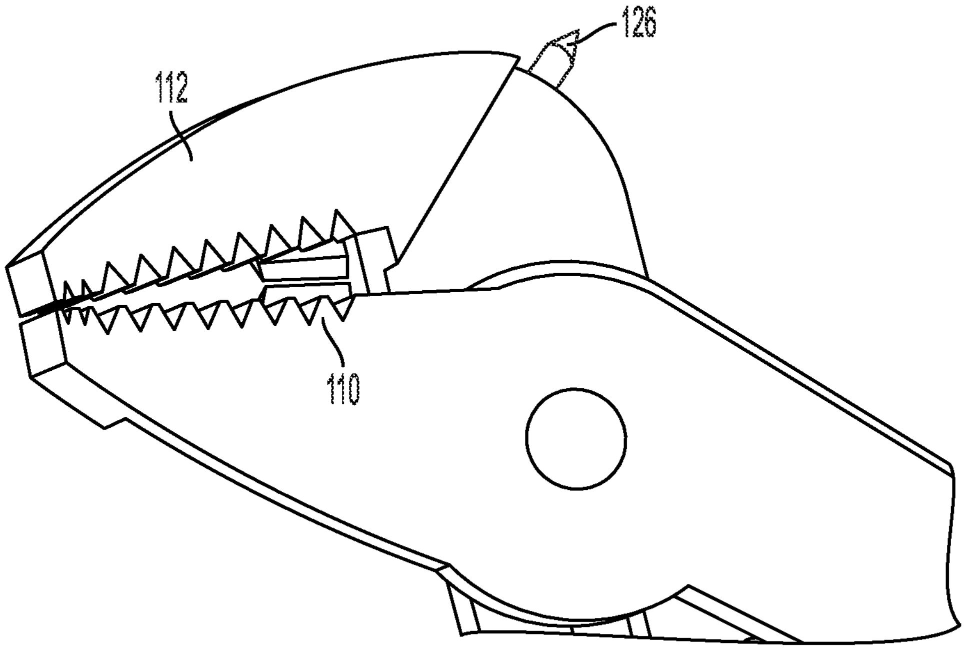
FIG. 7 is an enlarged view of a portion of the multifunction firefighting tool of FIG. 1 illustrating a pair of jaws and a window punch extending therefrom in accordance with embodiments of the present disclosure.

Referring to FIGS. 1 and 7, the upper jaw 112 may define a window punch 126 extending away therefrom. The window punch 126 may be formed integral, or monolithic, with the upper jaw 112. In some embodiments, the window punch 126 may be defined by the lower jaw 110 instead of, or in addition to, the upper jaw 112. For example, the window punch 126 may be a protrusion (e.g., having a hexagonal shape, a cylindrical or conical shape, or the like) formed integral with the upper jaw 112. In some embodiments, the window punch 126 may be coupled to the respective jaw (e.g., by welding, use of an adhesive, or the like).

In some embodiments, the window punch 126 may extend in a direction substantially parallel to the elongated slot 128. In some embodiments, the window punch 126 may extend in a direction substantially perpendicular to a portion of the upper jaw 112 that contacts the lower jaw 110. Where used in this context, substantially refers to a direction that is parallel (or perpendicular) or within 10 degrees, 20 degrees, 40 degrees, 50 degrees, or the like thereof. In some embodiments, the window punch 126 may be located at various locations on the upper jaw 112. For example and as shown in FIG. 7, the window punch 126 may be located at approximately halfway along the radius of the upper jaw 112. As another example, the window punch 126 may extend from a location on the upper jaw 112 that is substantially aligned with a longitudinal axis of the elongated slot 128. In that regard, the window punch 126 may extend in a direction substantially away from an outer end (or tip) of the upper jaw 112. Such placement may provide clearance for the window punch 126 to shatter glass without other portions of the tool 100 in the way.

The window punch 126 may extend away from the respective jaw by a distance of, for example, 0.25 inches, 0.5 inches, 1 inch, 2 inches, or the like. In some embodiments, the window punch 126 may be designed to have a relatively blunted point to reduce the likelihood of unintended injury to the user. The window punch 126 may be used to break glass (such as a window) in such a way as to shatter or break the glass with minimal likelihood of injury to the user or damage to the tool 100 or property.

Figure 9:
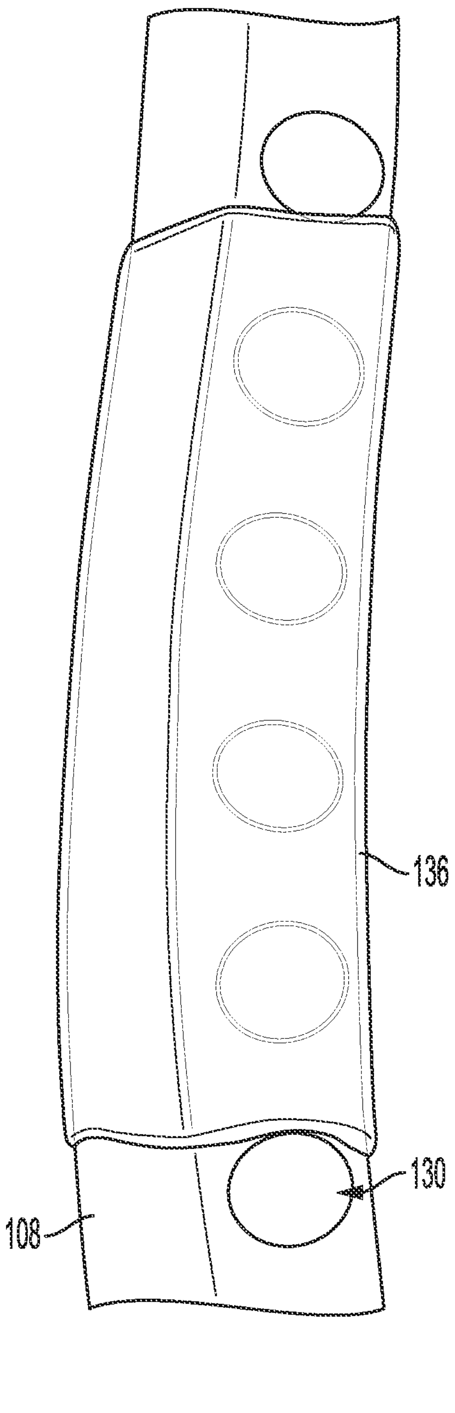
FIG. 9 is an enlarged view of a portion of the multifunction firefighting tool of FIG. 1 illustrating a plurality of insert holes in accordance with embodiments of the present disclosure.

In some embodiments and referring to FIGS. 1 and 9, the movable handle 108 and the fixed handle 106 may each define a plurality of insert holes 130 extending therethrough. The insert holes 130 may each extend in a direction parallel to each other (e.g., an insert hole defined by the movable handle 108 may extend in a direction parallel to an insert hole defined by the fixed handle 106). That direction may be perpendicular to a surface defined by the movable handle 108, the fixed handle 106, the upper jaw 112, and the lower jaw 110 (or perpendicular to a plane defined by surfaces of these components). In some embodiments, only one of the movable handle 108 or the fixed handle 106 may define insert holes 130.

In some embodiments, the movable handle 108 and the fixed handle 106 may each include any quantity of insert holes 130. For example, each handle 106, 108 may include between 0 and 10 insert holes, between 1 and 6 insert holes, 2 insert holes, 3 insert holes, 4 insert holes, or the like. The insert holes 130 may have any shape. For example and as shown, the insert holes 130 may have a round or cylindrical shape to receive objects having a circular or cylindrical shape. In some embodiments, the insert holes 130 may have a square or rectangular prism shape to receive objects having a square or rectangular cross section. In some embodiments, the insert holes 130 may include a hexagon or hexagonal prism shape (similar to the magnetic socket 124) to receive objects having a hexagonal cross section (such as the bit 125). In that regard, one or more insert hole 130 may function to receive a bit in a similar manner as the magnetic socket 124. In some embodiments, the insert holes may all have the same dimensions or shapes, and in some embodiments, the insert holes 130 may have different dimensions or shapes. For example, the fixed handle 106 may include 4 insert holes 130 including first and second insert holes having a circular shape and a same dimension (e.g., a same width), a third insert hole having a hexagonal shape with a first dimension (e.g., a width of a quarter of an inch), and a fourth insert hole having a hexagonal shape with a second dimension (e.g., a width of an eighth of an inch). Continuing the movable handle 108 may include 4 insert holes 130 including a first and second insert holes matching the shape, dimension, and location of the first and second insert holes of the fixed handle, a third insert hole having a squared shape with a first dimension (e.g., a width of a quarter of an inch), and a fourth insert hole having a squared shape with a second dimension (e.g., a width of an eighth of an inch).

The insert holes 130 may be designed to receive inserts for lugs usable to adjust valves (e.g., a lug wrench for opening and/or closing a valve such as a gas valve or a water valve, other equipment, or lugs for any other purpose). For example, lugs or pins may be inserted into two or more insert holes 130 and these lugs or pins may interface with a valve to facilitate opening or closing of the valve by cranking the plier 100 in a clockwise or counterclockwise direction. For example, a lug (not shown) may include two prongs extending outward therefrom. A first prong of the lug may be received by a first insert hole 130 (e.g., an insert hole defined by the movable handle 108) and a second prong of the lug may be received by a second insert hole 130 (e.g., an insert hole defined by the fixed handle 106). In some embodiments, both (or more) prongs of a lug may be received by insert holes of a single handle. For example, a first prong of a lug may be received by a first insert hole 130 of the fixed handle 106, and a second prong of the lug may be received by a second insert hole 130 of the fixed handle 106. After both (or more) prongs of the lug are received by respective insert holes 130, the lug may be used for its intended purpose (e.g., opening or closing a gas valve or water valve, or other equipment), for example, by rotating the tool 100 with the lug coupled thereto.

In some embodiments, the tool 100 may include an external clip or connector (not shown) designed to mate with (or otherwise retain in place relative to the tool 100) a lug (e.g., a lug wrench) to removably couple the lug to the tool 100. For example, the tool may have an external spring-loaded clip that exerts a force towards a handle 106, 108. A lug wrench may be designed to be received between the respective handle 106, 108 and the clip, such that the spring loading force retains the lug wrench in place between the clip and the handle 106, 108. As another example, a handle 106, 108 may define a protrusion extending therefrom, and a lug wrench may define a correspondingly shaped aperture. The aperture may be designed to receive the protrusion. A bulge or other feature defined by at least one of the protrusion or the aperture may resist separation of the protrusion from the aperture, thus removably coupling the lug to the tool 100. In that regard, when use of the lug is desirable, the lug may be removed from the external clip or connector and the prongs thereof may be positioned in the insert holes 130 for use.

In some embodiments, at least one of the fixed handle 106 or the movable handle 108 may define a compartment (i.e., they may be hollow). This feature may provide various advantages. First, the hollow nature of the handles 106, 108 may reduce a total weight of the tool 100. In addition, bits, lugs, or both may be stored in one or both handles 106, 108 to ensure they are available when needed.

Figure 3:
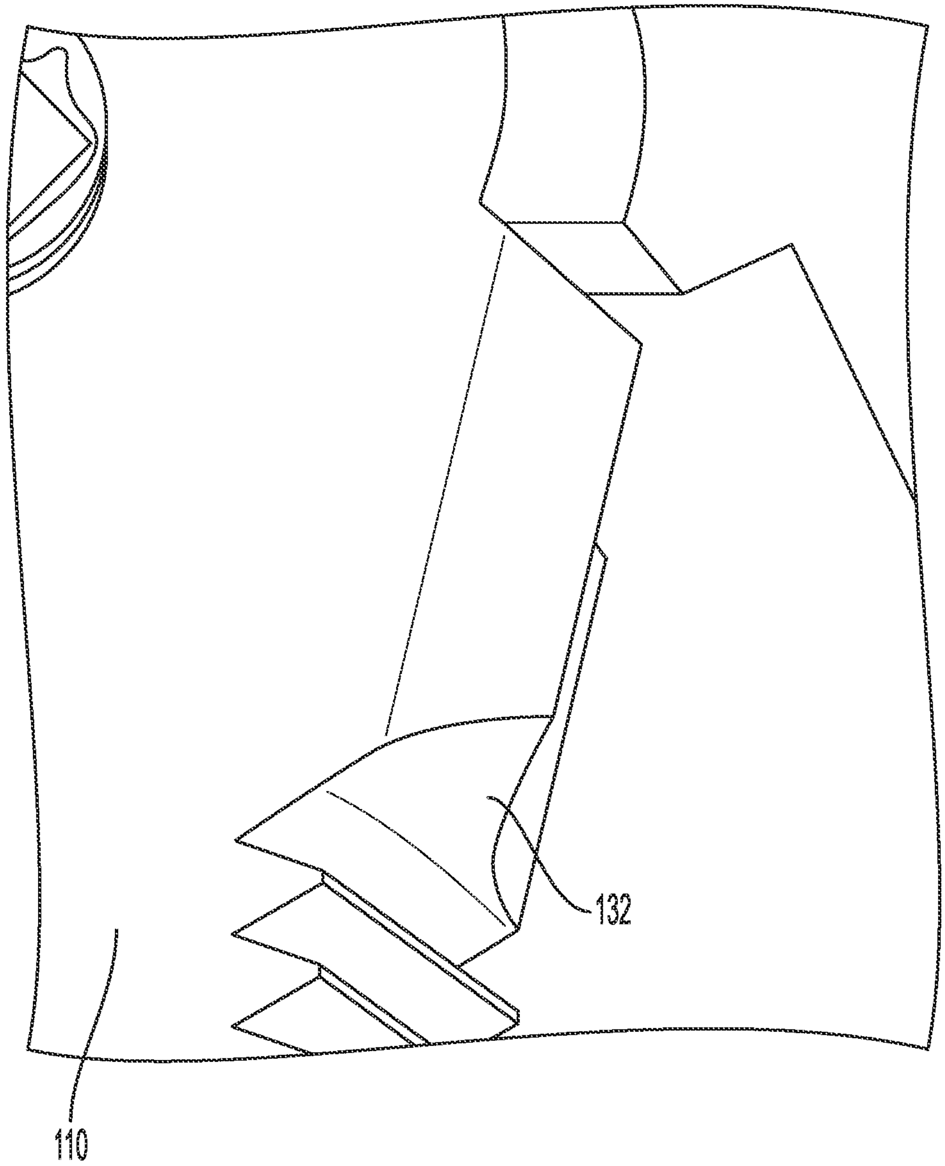
FIG. 3 is an enlarged view of a portion of the multifunction firefighting tool of FIG. 1 illustrating a wire cutter in accordance with embodiments of the present disclosure.

Referring to FIGS. 1, 2, and 3, the lower jaw 110 may define or include a wire cutter 132 that is designed to interface with the upper jaw 112 (e.g., a relatively flat region 200 defined by the upper jaw 112 and facing the wire cutter 132). The wire cutter 132 may include an elongated sharpened edge defined by the lower jaw 110. A wire may be located between the wire cutter 132 and the flat region 200 such that the sharpened edge cuts through the wire in response to pressure applied to the handles 106, 108 (the pressure urging the wire cutter 132 towards the flat region 200). In some embodiments, the wire cutter 132 may be located in or on the upper jaw 112 and be designed to interface with the lower jaw 110. In some embodiments, the wire cutter 132 may be defined by both the lower jaw 110 and the upper jaw 112. The wire cutter 132 may be designed to cut through a variety of soft and hard wires or cables. For example, the wire cutter 132 may have a length of between 0.25 inches and 1 inch, between 0.33 inches and 0.66 inches, or about 0.5 inches.

Figure 4:
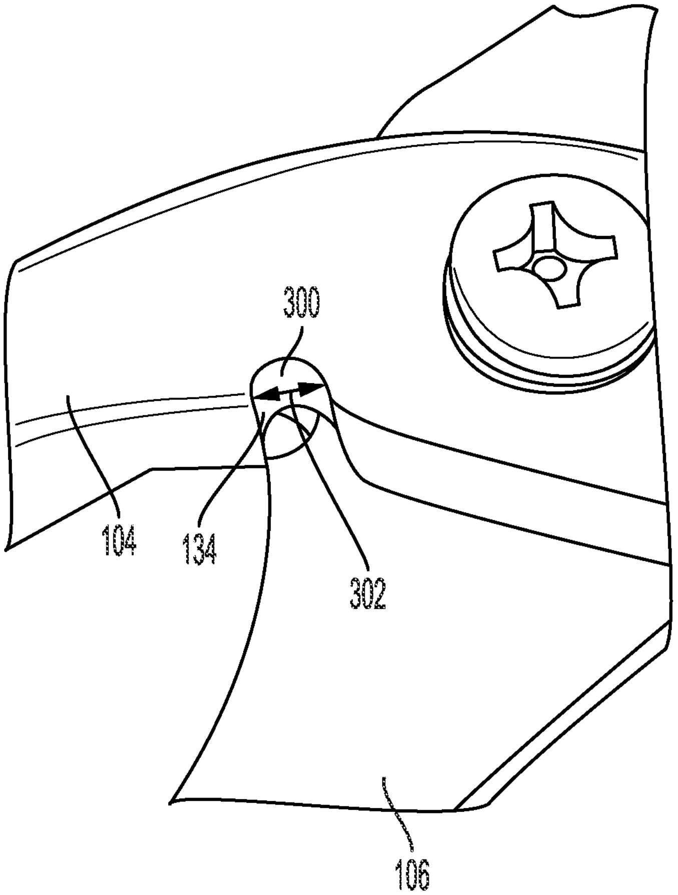
FIG. 4 is an enlarged view of a portion of the multifunction firefighting tool of FIG. 1 illustrating a cable cutter in accordance with embodiments of the present disclosure.

Referring to FIGS. 1 and 4, the movable handle 108 may define a cable cutter 134 that is designed to interface with the fixed handle 106. In some embodiments, the cable cutter 134 may be located in or on the fixed handle 106 and be designed to interface with the movable handle 108. In some embodiments, the cable cutter may be defined by both the movable handle 108 and the fixed handle 106. The cable cutter 134 may include a cutout or void 300 defined by the movable handle 108 and designed to receive a cable therein. In some embodiments, the edge of the cutout or void 300 may be sharpened to facilitate cutting of cables. As the movable handle 108 moves towards the fixed handle 106, the fixed handle 106 may become adjacent to the cutout or void 300 and cross over the cutout or void 300. In response to this movement and the cable being within the cutout or void 300, the interference between the edge of the cable cutter 134 and the fixed handle 106 cuts, tears, or otherwise separates the cable into two. The cable cutter 134 may be designed to cut through thicker wires or cables than the wire cutter 132 (e.g., fence wires, fence post ties, nails, etc.). For example, the cable cutter 134 may be a $3/16^{th}$ inch cable cutter. That is, the cutout or void 300 may have a dimension 302 that is $3/16^{th}$ of an inch. In some embodiments, the dimension 302 may be between $1/16^{th}$ of an inch and 1 inch, between $1/16^{th}$ of an inch and ½ of an inch, between $1/16^{th}$ of an inch and $6/16^{th}$ of an inch, between $2/16^{th}$ of an inch and $4/16^{th}$ of an inch, or the like.

In some embodiments and referring to FIGS. 1 and 9, the plier 100 may include one or more grip 136. For example, the grip 136 may extend over at least one of the movable handle 108 or the fixed handle 106 and provide at least one of a gripping surface or insulation for a user. For example, the grip 136 may include a rubber, polyester, plastic, or other polymer or natural material. The grip 136 may be designed to interface with the handles 106, 108 via an interference fit to allow the grip 136 to slide on and off of the handles 106, 108. In some embodiments, the grip 136 may be designed to provide friction between the grip 136 and the handles 106, 108 to resist unwanted movement between the grip 136 and the handles 106, 108. In some embodiments, the grip 136 may also be designed to provide friction between the grip 136 and hands to resist unwanted movement between the tool 100 and the hands. The grip 136 may be formed from a relatively soft material to increase comfort of a user while using the tool 100. The grip 136 may be designed to slide relative to at least one of the handles 106, 108 to allow a user to move the grip 136 to provide access to selected insert holes 130. For example, if a user desires access to two adjacent insert holes 130 then the grip 136 may be moved along a respective handle 106, 108 to expose two adjacent insert holes 130. As another example, if a user desires access to two insert holes 130 on separate ends of the respective handle 106, 108 then the grip 136 may be removed from the handle 106, 108 or moved to a center of the handle 106, 108 to expose the desired insert holes 130. The ability to move the grip 136 relative to the handles 106, 108 also allows the grip 136 to be removed and replaced after being exposed to wear and tear. In some embodiments, the grip 136 may be formed on one or both handle 106, 108 and designed to remain in place relative to the respective handle 106, 108.

In some embodiments and referring to FIGS. 1 and 8, the plier 100 may include a nail puller 138 at a distal end of the pry tool 120 (i.e., the end of the pry tool 120 farthest from the lower jaw 110). The nail puller 138 may be formed into the pry tool 120 and may include a V-shaped slot defined by the pry tool 120 such that a nail head may be located within the V-shaped slot and the pry tool 120 may be leveraged against an object to remove the nail from the object.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A multi-purpose firefighting tool having multiple functions, the tool consisting of:

a first leg having a pivot point, a first handle on a first side of the pivot point, and an upper jaw on a second side of the pivot point, the first handle fixed to the upper jaw, the upper jaw having an inner surface defining teeth and an outer surface opposite the inner surface and defining a window punch extending away from the outer surface and defining a point at a farthest distance from the outer surface; and a second leg rotatably coupled to the first leg at the pivot point and having a second handle on the first side of the pivot point and a lower jaw on the second side of the pivot point, the second handle fixed to the lower jaw, the lower jaw having an inner surface defining teeth substantially facing the teeth of the inner surface of the upper jaw, having an outer surface opposite the inner surface, and defining a spanner extending away from the upper jaw, wherein:

each of the first handle and the second handle having a distal end opposite the pivot point, one of the first handle or the second handle defines a magnetic socket at the distal end thereof for receiving a tool bit, and the other of the first handle or the second handle defines a pry tool located at the distal end thereof and extending away from the pivot point, a distal end of the pry tool defines a nail puller, the second leg defines an elongated slot configured to receive a pin coupled to the first leg to facilitate adjustment of a distance between the upper jaw and the lower jaw, one of the upper jaw or the lower jaw defines a wire cutter configured to interface with the other of the upper jaw or the lower jaw to cut through wires, one of the second handle or the first handle defines a cable cutter configured to interface with the other of the second handle or the first handle, the cable cutter being configured to cut through wires of a thicker gauge than the wire cutter, each of the first leg and the second leg defines a plurality of insert holes extending therethrough for receiving valve adjustment lugs, wherein a removable grip extends over only one of the first handle or the second handle to provide at least one of a gripping surface or insulation for a user, the removable grip is configured to slide on the respective handle to provide access to the plurality of insert holes, and the window punch extends along a direction of movement of the upper jaw relative to the lower jaw.

* * * * *